(12) United States Patent
Higgs et al.

(10) Patent No.: US 9,830,160 B1
(45) Date of Patent: Nov. 28, 2017

(54) LIGHTWEIGHT PROFILING USING BRANCH HISTORY

(71) Applicant: INTERNATIONAL BUSINESS MACHINES CORPORATION, Armonk, NY (US)

(72) Inventors: Raymond M. Higgs, Poughkeepsie, NY (US); Luke M. Hopkins, Peterborough, NH (US); Mushfiq U. Saleheen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/273,156

(22) Filed: Sep. 22, 2016

(51) Int. Cl.
*G06F 15/00* (2006.01)
*G06F 7/38* (2006.01)
*G06F 9/00* (2006.01)
*G06F 9/44* (2006.01)
*G06F 9/38* (2006.01)

(52) U.S. Cl.
CPC .................................. *G06F 9/3844* (2013.01)

(58) Field of Classification Search
None
See application file for complete search history.

(56) References Cited

U.S. PATENT DOCUMENTS

| 6,000,044 | A | * | 12/1999 | Chrysos | G06F 11/348 |
|---|---|---|---|---|---|
| | | | | | 702/182 |
| 6,237,073 | B1 | | 5/2001 | Dean et al. | |
| 9,280,572 | B2 | | 3/2016 | Gopalakrishnan et al. | |
| 2004/0030962 | A1 | * | 2/2004 | Swaine | G06F 11/25 |
| | | | | | 714/45 |
| 2009/0316603 | A1 | | 12/2009 | Amerga et al. | |

FOREIGN PATENT DOCUMENTS

EP          999499 A2   10/2000

* cited by examiner

*Primary Examiner* — George Giroux
(74) *Attorney, Agent, or Firm* — Cantor Colburn LLP; Steven Chiu

(57) ABSTRACT

Technical solutions are described for profiling an execution of a computer program. An example method includes setting a program-counter indicator to a first state in response to updating a program counter register. The method further includes profiling the execution of the computer program by periodically sampling the program counter register according to a sampling time-interval. Sampling the program counter register includes recording a content of the program counter register in response to the program-counter indicator being in the first state. The method also includes increasing the sampling time-interval.

15 Claims, 6 Drawing Sheets

LIGHTWEIGHT PROFILING USING BRANCH HISTORY

BACKGROUND

The present application relates to computer technology, and more specifically, to profiling a computer program.

Typically, computer programs are analyzed using statistical profiling. For example, execution of the computer program is sampled at a regular predetermined interval by sampling the program counter of the processor. The sampling information is saved, and after several samples are accumulated, a summary of where the program is spending time is determined.

SUMMARY

According to one or more embodiments, a computer implemented method for profiling an execution of a computer program includes setting, by a processor, a program-counter indicator to a first state in response to updating a program counter register. The method further includes profiling the execution of the computer program by periodically sampling the program counter register according to a sampling time-interval. Sampling the program counter register includes recording a content of the program counter register in response to the program-counter indicator being in the first state. The computer implemented method also includes increasing the sampling time-interval.

According to one or more embodiments, a system for profiling an execution of a computer program includes a memory configured to store a branch history table, and a processor coupled with the memory. The processor sets a branch-history-entry indicator associated with a branch history table entry (BHTE) from the branch history table, to a first state in response to creating the BHTE. The processor also profiles the execution of the computer program by periodically sampling the branch history table according to a sampling time-interval, where sampling the branch history table includes, in response to the branch-history-entry indicator being in the first state, recording a content of the BHTE. The processor also increases the sampling time-interval According to one or more embodiments, a computer program product for profiling an execution of a computer program includes a computer readable storage medium that includes computer executable instructions to set a program-counter indicator to a first state in response to updating a program counter register. The computer readable storage medium further includes instructions to profile the execution of the computer program by periodically sampling the program counter register according to a sampling time-interval. Sampling the program counter register includes recording a content of the program counter register in response to the program-counter indicator being in the first state. The computer readable storage medium further includes instructions to change the sampling time-interval.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Typically sampling a computer program is done by another computer program, which may be referred to as sampling program. Sampling the computer program can be expensive. In one or more examples, the sampling is implemented as an interrupt. In one or more examples, the processing time for an interrupt is larger than the time required to store the value of the program counter. Accordingly, the frequency of the sampling adversely affects performance as the sampling introduces overhead. Hence, the frequency of the sampling is predetermined to a longer interval, which may lead to an increase in run time to accumulate enough number of samples for an accurate statistical analysis.

Alternatively, in one or more examples, the sampling is implemented using multiple processors. For example, another processor, separate from a processor that executes the computer program, executes the sampling program. Thus, the overhead for the interrupt on the processor running the computer program being profiled can be avoided. However, such techniques introduce cross-processor communication overhead. Further, another processor is not always available.

The technical solutions described herein improve the sampling and consequently the profiling of the computer program. For example, the technical solutions sample branch history in addition to the program counter. The technical solutions thus capture an increased amount of useful information for each interval without adding significant overhead. Further, the technical solutions may be used in both cases described above, sampling based on interrupts, and sampling based on multiprocessor. Additionally, the technical solutions dynamically determine a sampling interval to be used for capturing the profiling data for the computer program.

Additionally, the technical solutions facilitate improving efficiency of storing the profiling data. For example, only changed entries are included in the saved profiling data, and the unchanged entries are not saved in the profiling data (because they have already been accounted for in a previous interval), thus avoiding redundant data for analyzing.

As such the technical solutions are rooted in and/or tied to computer technology in order to overcome a problem specifically arising in the realm of computers, specifically improving the efficiency of computer programs by profiling the computer programs.

In exemplary embodiments, the technical solutions use a branch history table that processors generate for branch prediction, and debugging. The branch history identifies which branches have recently been executed. The technical solutions use the branch history along with static code analysis to generate precise instruction traces.

Figure 1:
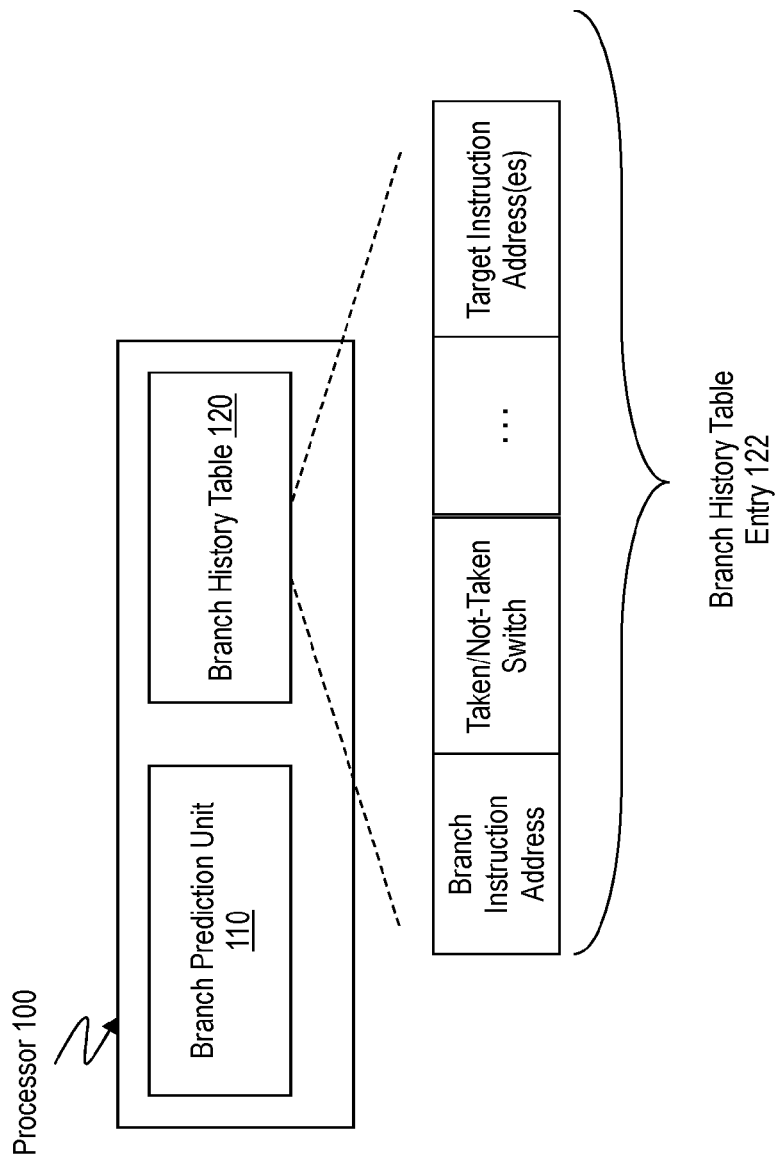
FIG. 1 illustrates a processor in accordance with one or more embodiments.

FIG. 1 illustrates a processor 100 that includes a branch prediction unit 110. The branch prediction unit 110 generates a branch history table 120. The branch history table 120 is a memory, such as a cache memory, that is associated with instruction fetching operation(s) of the processor 100. In one or more examples, the processor 100 may include an instruction fetch unit (not shown) that performs the instruction fetching. The processor 100 uses the instruction fetching operation to read an instruction that is to be executed by the processor 100. The processor 100 may prefetch an instruction that is to be executed by the processor 100, to increase the efficiency of executing multiple instructions. To address the technical problem of prefetch penalties that the processor 100 may incur in case of a branch in the instructions to be executed, for example, a conditional instruction, the processor 100 uses the branch prediction unit 110. Although, typically a branch instruction is a conditional branching instruction, in one or more examples the branch may be an unconditional branching instruction (such as a JUMP instruction).

The branch prediction unit 110 may use dynamic branch prediction. In this case, the branch prediction unit 110 stores execution history of branch instructions in the branch history table 120. The branch history table 120 includes one or more branch history table entries (BHTE), such as a BHTE 122. The BHTE 122 includes information about the branching instruction, such as an address of the branching instruction, taken/not-taken switch, an interval length, and address of target instruction(s), among other information. In one or more examples, the BHTE 122 includes fewer or additional fields than those illustrated herein. The taken/not-taken switch may include one or more bits. For example, a specific bit in the taken/not-taken switch indicates whether the branching instruction was taken (or not taken). In one or more examples, a second bit in the switch may indicate whether a previous branching instruction was taken (or not taken). The branch prediction unit 110 uses the taken/not-taken switch of the one or more BHTEs from the branch history table 120 to predict whether a next branching instruction will be taken or not taken. Further, based on the prediction, the processor 100 prefetches instruction(s) from the target instruction address that is corresponding to the prediction. Alternatively or in addition, the taken/not-taken switch may indicate whether the BHTE 122 has been processed by a profiling program.

Figure 2:
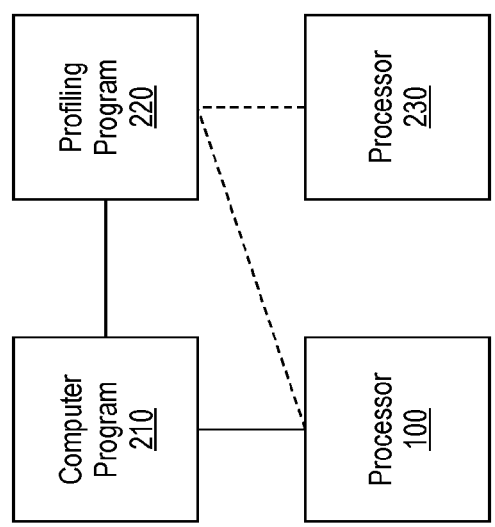
FIG. 2 illustrates a computer program being profiled by a profiling program in accordance with one or more embodiments.

FIG. 2 illustrates a computer program 210 being profiled by a profiling program 220. The computer program 210 includes one or more computer executable instructions that are executed by the processor 100 for executing the computer program 210. The profiling program 220 samples the execution of the computer program 210 at a predetermined sampling interval. As described herein, the profiling program 220 may also execute on the processor 100, and cause an interrupt at each sampling interval, which pauses execution of the computer program 210. The profiling program 220 captures the value of a program counter register of the processor 100 and further facilitates resuming the execution of the computer program 210. Alternatively, the profiling program 220 may execute on a second processor 230, and at the predetermined sampling interval, request the value of the program counter register of the processor 100. The program counter register keeps track of the address of the instruction that is currently being executed. Accordingly, by analyzing the captured values of the program counter register at the predetermined sampling intervals, the profiling program 220 can determine the time spent by the computer program 210 in specific portions of the computer program. A computer programmer may improve the performance of the computer program 210 based on a report of such analysis.

The technical solutions described herein add a program counter indicator, which is associated with the program counter register of the processor 100. In one or more examples, the program counter indicator may be a bit. Other examples may use an additional number of bits for the program counter indicator. The program counter indicator has two states, a first state that indicates that the processor has updated the program counter register and a second state that indicates that the profiling program 220 has captured the current value of the program counter register.

The examples described further use a single bit for the program counter indicator, but it is understood that other examples can use an additional number of bits. In the following examples, the first state is represented by the bit being cleared (0), and the second state is represented by the bit being set (1).

Figure 3:
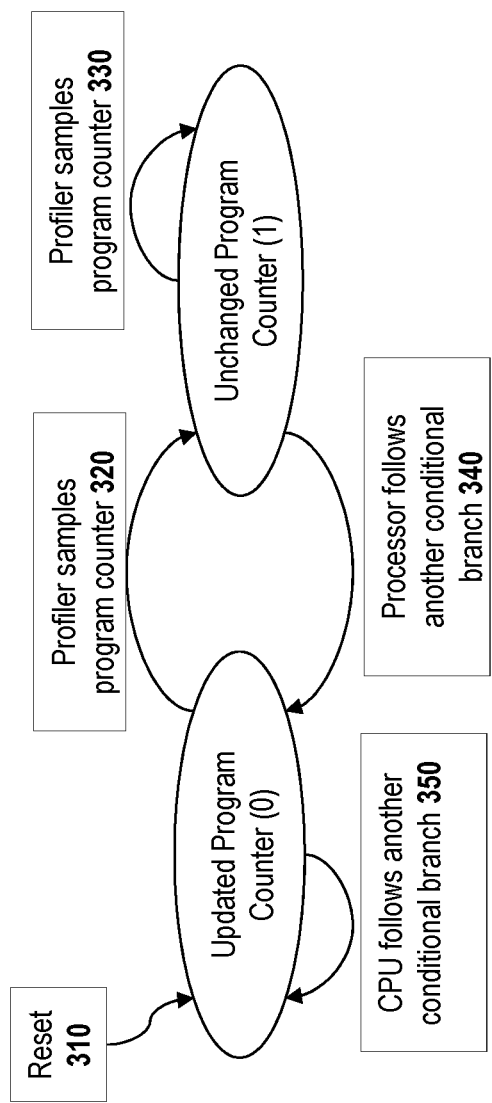
FIG. 3 illustrates a method for updating a program counter indicator, according to one or more embodiments.

FIG. 3 illustrates a method for updating the program counter indicator. In one or more examples, the bit is cleared each time the processor 100 changes the program counter register, as shown at 310. The bit is set each time the profiling program 220 saves the value of the program counter register, as shown at 320. If the bit is set for a given sample, it is an indication that the computer program 210 has not progressed since the last sampling interval, as shown at 330. For example, the processor 100 may be in some type of wait instruction, or some long running instruction, such as crypto, compression, and the like. If the processor 100 follows a different instruction, such as a conditional branching instruction, the processor resets the bit (0), as shown at 340 and 350. The bit is reset, irrespective of whether the profiling program 220 has sampled the current value of the program counter indicator.

The technical solutions described herein sample the branch history table 120 in addition to the program counter register. In addition, the technical solutions described herein, add a BHTE indicator, which is associated to each BHTE 122. The BHTE indicator bit indicates if the BHTE 122 has changed during the predetermined sampling interval. The BHTE indicator has two states, a first state that indicates that the processor 100 has updated the BHTE 122, and a second state that indicates that the profiling program 220 has captured the information from the BHTE 122. In one or more examples the taken/not-taken switch illustrated in FIG. 1 is used for the BHTE indicator. Alternatively, if the taken/not-taken switch includes one or more bits that are used as the BHTE indicator.

The BHTE indicator may be a bit. Other examples may use an additional number of bits for the BHTE indicator. The examples described herein use a single bit as the BHTE indicator, but it is understood that other examples can use an additional number of bits.

Figure 4:
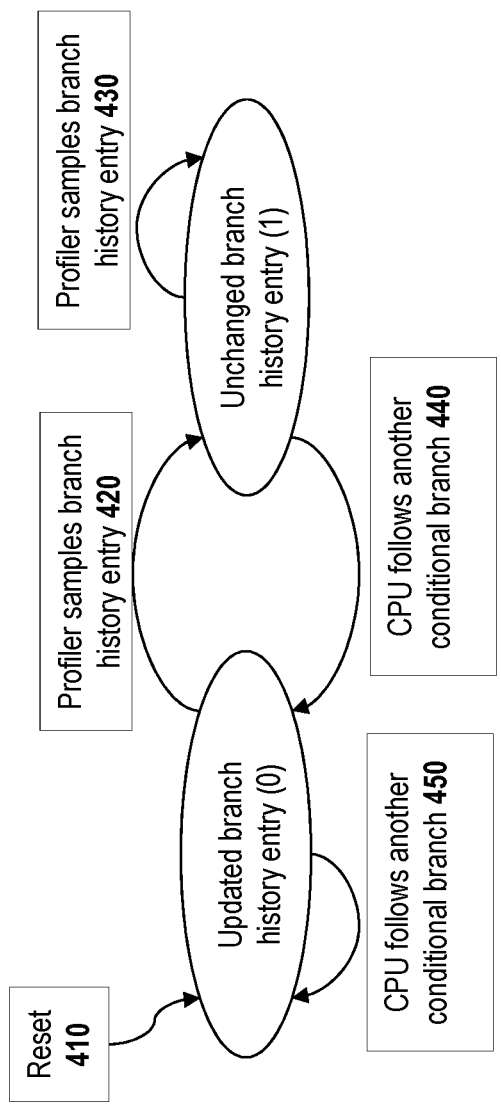
FIG. 4 illustrates a method for updating a branch history table entry indicator, according to one or more embodiments.

FIG. 4 illustrates a method for updating the state of the BHTE indicator. When the processor 100 creates and/or updates the BHTE 122, the processor 100 clears the BHTE indicator bit, as shown at 410. When the profiling program 220 samples the BHTE 122, the BHTE indicator bit is set. If the profiling program 220 samples the BHTE 122 and finds the BHTE indicator bit set already, the profiling program 220 deems that the BHTE 122 has not been updated during the sampling interval, as shown at 430. If the profiling program 220 samples the BHTE 122 and finds the BHTE indicator bit cleared, the profiling program 220 deems that the BHTE 122 has changed during the sampling interval, and sets the BHTE indicator bit as shown at 420. When the processor 100 initiates execution of a new branching instruction, the processor 100 creates a new BHTE, the BHTE indicator bit is cleared, as shown at 440. The processor clears the BHTE indicator bit each time the processor initiates execution of a branching instruction, irrespective of whether the profiling program 220 has sampled the BHTE indicator bit, as shown at 450.

Based on the program counter indicator and the BHTE indicator, the profiling program 220 determines whether to capture and save state information, that is profiling data, associated with the execution of the computer program 210. Specifically, the profiling program 220 only saves changed entries of the profiling data and does not save unchanged entries because they have already been accounted for in an earlier sampling interval.

In one or more examples, the profiling program 220 stores the profiling data of the computer program 210 as shown in table 1. The profiling data may include multiple entries of sample information, where each entry is acquired in the respective sampling interval.

TABLE 1

| Sample information 0 | Sample information 1 | Sample information 2 | . . . | Sample information M |
|---|---|---|---|---|

Each entry in the profiling data may have a variable length because an entry captures the program counter value and the branch history table entries at each sampling interval based on the program counter indicator and the BHTE indicator. The profiling program 220 stores a timestamp associated with each profiling data entry. Table 2 illustrates an example of a profiling data entry.

TABLE 2

| Sample count | Program counter | Branch Instr 0 | Branch Instr 1 | . . . | Branch Instr N | Timestamp |
|---|---|---|---|---|---|---|

In the illustrated example, the profiling data entry is illustrated as an array. The array includes a sample count as the first entry that indicates the number of entries stored in the current profiling data entry array, and the remainder of the array includes instruction addresses associated with the ongoing execution of the computer program 210. For example, the first instruction address is the value from the program counter register, and the others are branching instruction addresses from the branch history table 120. In one or more examples, the profiling data array may include the branch history table entries. The number of branch history related entries in the profiling data entry is variable based on the BHTE indicator. Only entries that have changed since the last sample are stored. The number of entries in the profiling data entry may be variable.

For example, the sample count may be zero. In this case, there are no instruction addresses in the profiling data entry. This indicates that the processor 100 has not executed any additional instructions from the computer program 210 since the last sampling interval.

On the other extreme, the sample count may be as large as the total number of branch history entries in the branch history table 120 plus 1. This is the maximum value for the sample count. In other examples, the sample count may be any value between zero and the maximum.

The profiling data entry includes addresses of the branch history instructions that have been executed since the last sampling interval. For example, in the illustrated example, Branch Instr 0 is the most recently followed branch, Branch Instr 1 is an older branch, and so on until Branch Instr N is the oldest branch history entry.

In one or more examples, the profiling program 220 analyzes the sample count in the sampling intervals and adjusts the length of the sampling interval. For example, when the sample count is less than the maximum sample count, then the profiling program 220 can perfectly reconstruct the instruction stream from the computer program 210 that the processor executed. In other words, there are no gaps when the sampling information is post-processed, that there is continuity.

Whether continuity exists may be identified based on the oldest BHTE, for example, if the oldest branch history entry has changed, there is no continuity. In one or more examples, both, the processor 100 and the profiling program 220, may recognize the existence of continuity in the profiling data entry. When the processor 100 and/or the profiling program 220 recognize that continuity exists, the processor 100, or the profiling program 220 increases the length of the sampling interval. This reduces the overhead of profiling while possibly increasing the chances of discontinuities. Discontinuities are not detrimental for profiling, so this may be a reasonable tradeoff. Further, in one or more examples, in case of a discontinuity the profiling program 220 decreases the sampling interval. The profiling program 220 increases and/or decreases the sampling interval according to a predetermined interval step. In one or more examples, the predetermined interval step may be configurable, for example by a user of the profiling program 220. Further, a first interval step for increasing the sampling interval in case of detecting continuity may be distinct from a second interval step for decreasing the sampling interval in case of detecting a discontinuity.

In one or more examples, the profiling program 220 is associated with a minimum sampling interval, and a maximum sampling interval. The minimum sampling interval serves as a lower limit for the value of the sampling interval, and the maximum sampling interval serves as an upper limit for the value of the sampling interval. In one or more examples, the minimum sampling interval and/or the maximum sampling interval are configurable. Further, in one or more examples, the dynamic adjustment of the sampling interval may be disabled, such as by making a selection to that effect, or by setting the minimum and the maximum sampling interval values to the same value, by setting the sampling interval step to be 0 (zero), and so on.

Figure 5:
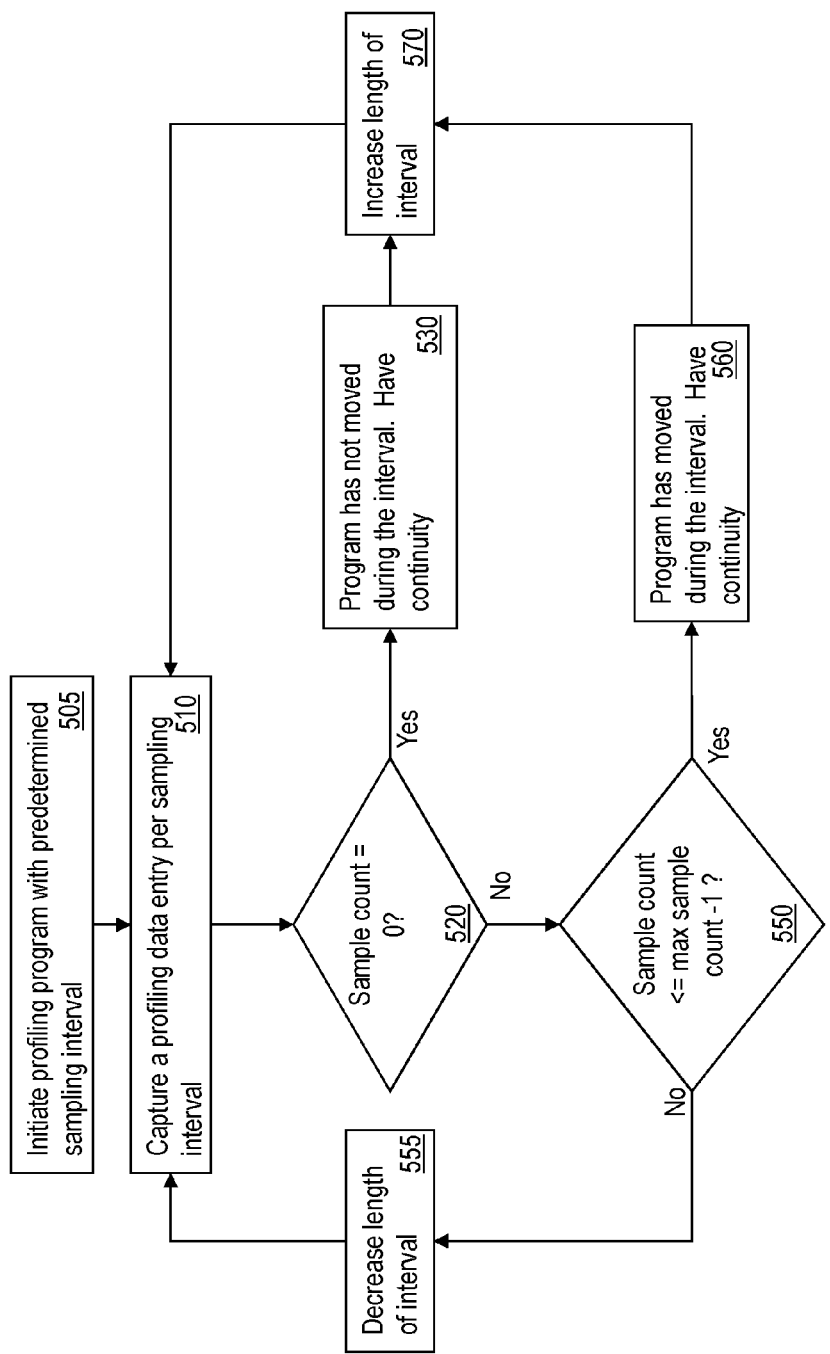
FIG. 5 illustrates a flowchart of a method for dynamically changing the sampling interval for the profiling program, according to one or more embodiments.

FIG. 5 illustrates a flowchart of a method for dynamically changing the sampling interval for the profiling program 220. In the description below, the profiling program 220 implements, the method, however in other examples, the processor 100 can implement the method.

The profiling program 220 is initiated with a sampling interval setup at a predetermined value, as shown at 505. For example, the predetermined value may be every 100 milliseconds, every 10 milliseconds, or any other such predetermined frequency. The profiling program 220 captures the profiling data entry, as shown at 510. The profiling program 220 analyzes the profiling data entry to determine the sampling interval in a dynamic manner. For example, the profiling program 220 checks whether the sampling count in the profiling data entry is 0, as shown at 520. If the sampling count is 0, execution of the computer program 210 has not progressed, and continuity exists, as shown at 530. Continuity indicates whether the profiling program 220 can reconstruct the stream of instructions of the computer program 210 that the processor 100 executed since the last sampling interval. If the continuity exists, the profiling program 220 increases the length of the sampling interval, as shown at 570.

In case the sample count in the profiling data entry is not 0, the profiling program 220 checks if the sample count is less than the maximum value −1, where the maximum value is the number of entries in the branch history table 120, as shown at 550. If the sampling count is larger, the profiling program 220 deems that there is no continuity. In one or more examples, the profiling program 220 continues using the current length of the sampling interval, or in other words, the profiling program 220 continues profiling the computer program 210 at the current frequency. Alternatively, the profiling program 220 decreases the sampling interval (or increases the sampling frequency), as shown at 555. Instead, if the sample count is less than or equal to the maximum value −1, the profiling program 220 deems that the execution of the computer program 210 progressed since last sampling and continuity exists, as shown at 560. Accordingly, the profiling program 220 increases the length of the sampling interval, as shown at 570.

The two indicators that are used, one for the program counter and one for the BHTE 122, in combination facilitate determining the time spent by the processor 100 executing a branch in the computer program 210. Thus, time spent in the different parts of the computer program 210 can be determined.

Figure 6:
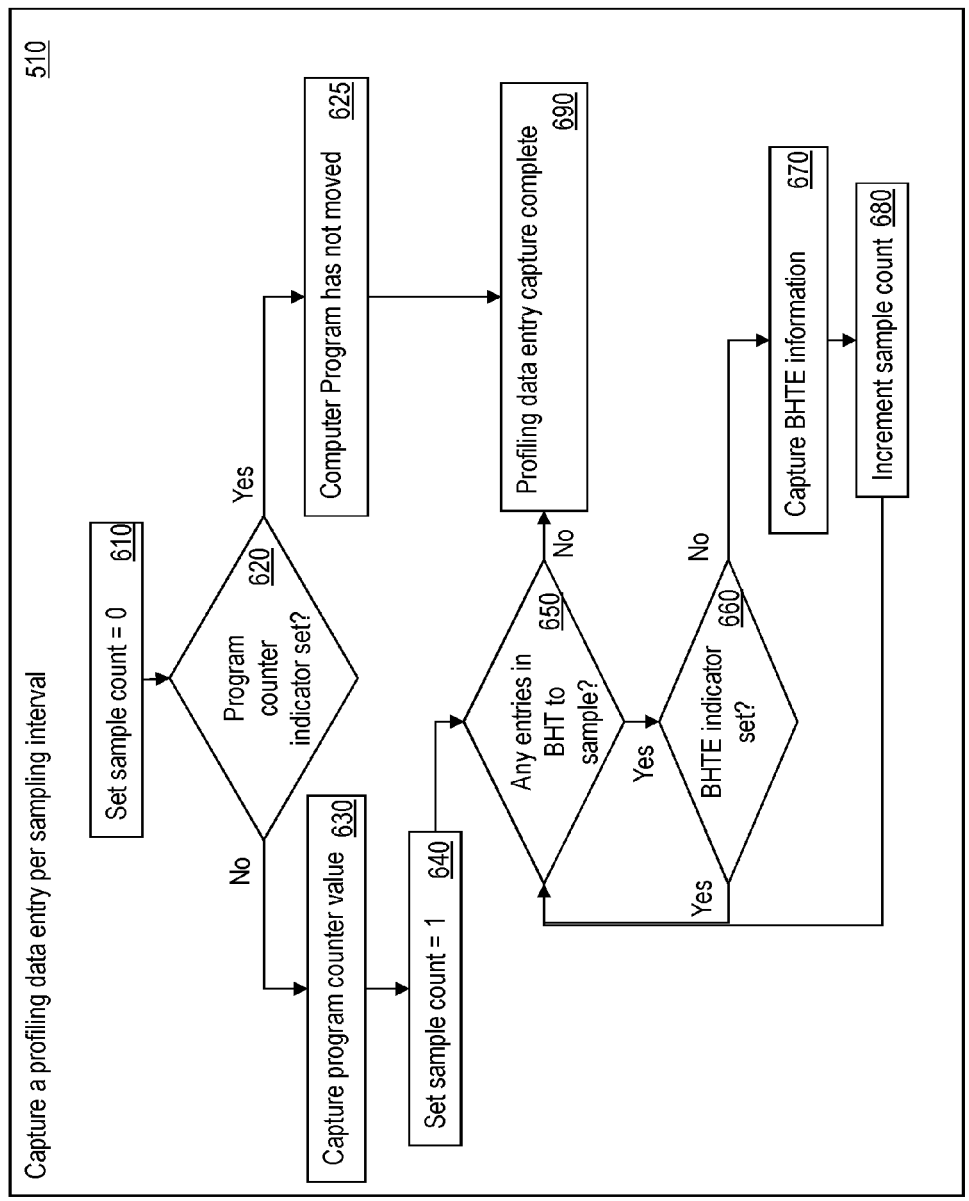
FIG. 6 illustrates a flowchart of an example method for capturing the profiling data entry, according to one or more embodiments.

FIG. 6 illustrates a flowchart of an example method for capturing the profiling data entry, which was shown at 510 in FIG. 5. At each sampling interval, the profiling program 220 initializes a new profiling data entry, and sets the sample count to 0, as shown at 610. The profiling program 220 determines if the program counter indicator is set (1), as shown at 620. It is understood that in other examples, the profiling program 220 may check if the program-counter indicator is cleared (0). If the program counter indicator is set, it is indicative that the execution of the computer program 210 has not progressed, or in other words that the processor 100 is still executing the same instruction as during the previous sampling interval, as shown at 625. Accordingly, the profiling program 220 does not add any further data in the profiling data entry and completes capturing the profiling data entry with the sample count set to 0, as shown at 690.

Instead, if the program counter indicator is not set, meaning it is cleared, the profiling program 220 captures the value of the program counter in the first field of the profiling data entry, as shown at 630. The profiling program 220 further increments the sample count by 1, or sets the sample count to 1, as shown at 640. The profiling program 220 further determines if the branch history table 120 includes any BHTEs that have not been profiled, as shown at 650. If the branch history table 120 includes the BHTE 122 that is not yet profiled, the profiling program 220 checks the BHTE indicator, as shown at 660. If the BHTE indicator is not set, meaning it is cleared, the processor has not profiled the corresponding BHTE. Accordingly, the profiling program 220 captures information from the BHTE (or the BHTE entirely) in the next field of the profiling data entry, as shown at 670. The profiling program 220 further increments the sample count of the profiling data entry, as shown at 680. Accordingly, by using the two indicators, the profiling program 220 only captures the unchanged BHTEs since the last sampling.

Accordingly, the technical solutions described herein sample branch history in addition to the program counter, thus increasing the amount of useful information captured for each sampling interval without adding substantial overhead. The sampling techniques described herein can be used for both, the interrupt-based sampling implementation, and the multiprocessor-based sampling implementation.

Further, a branch-history-entry indicator is added to each branch history entry. This branch-history-entry indicator is used to determine if the entry has changed during the previous sampling interval. When the processor creates/updates a branch history entry, it clears the branch-history-entry indicator. When profiling program samples a branch history entry, the branch-history-entry indicator is set. If the profiling program samples an entry and finds the branch-history-entry indicator set, the profiling program deems that this entry has not been updated during the interval. If the profiling program samples an entry and finds the branch-history-entry indicator cleared, the profiling program deems that this entry has changed during the interval. The profiling program includes only changed entries in the saved profiling data. Unchanged entries are not saved in the profiling data because they have already been accounted for in a previous interval.

The technical solutions described herein further facilitate one processor in a multiprocessor system to monitor the performance, that is profile, the remaining multiple processors in the multiprocessor system. Thus, efficiency of the profiling program that is executing on the profiling processor is critical so that the remaining processors can be profiled accurately.

In one or more examples, the profiling program maintains a separate sampling interval for each processor in the multiprocessor system, and updates each respective sampling interval dynamically as described herein.

The profiling program further analyzes the profiling data captured and dynamically updates the sampling interval being used to sample the execution of the computer program.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for profiling an execution of a computer program, the method comprising:
   setting, by a processor, a program-counter indicator to a first state in response to updating a program counter register;
   profiling the execution of the computer program by periodically sampling the program counter register according to a sampling time-interval, wherein sampling the program counter register comprises:
      in response to the program-counter indicator being in the first state, recording a content of the program counter register in a profiling data entry, wherein the profiling data entry comprises:
         an array of entries; and
         a sample count that indicates a number of entries in the array;
      modifying the sampling time-interval, wherein the sampling time-interval is increased in response to the sample count being less than a number of entries in a branch history table of the processor and the sampling time-interval is decreased in response to the sample count being more than the number of entries in the branch history table; and
      in response to recording the content of the program counter register, setting the program-counter indicator to a second state, wherein the first state of the program-counter indicator indicates that the program counter register has been updated and the second state indicates that a current value of the program counter register has been recorded.

2. The computer implemented method of claim 1, wherein the sampling time-interval is increased in response to the sample count being zero.

3. The computer implemented method of claim 1, further comprising:
   setting, by the processor, a branch-history-entry indicator associated with a branch history table entry (BHTE) from a branch history table, to a first state in response to creating the BHTE; and
   wherein, profiling the computer program further comprises periodically sampling the branch history table according to the sampling time-interval, wherein sampling the branch history table comprises, in response to the branch-history-entry indicator being in the first state, recording a content of the BHTE.

4. The computer implemented method of claim 3, wherein the contents of the BHTE are recorded in the profiling data entry, and the method further comprises incrementing the sample count of the profiling data entry.

5. The computer implemented method of claim 4, wherein the sampling time-interval is increased in response to the sample count being less than a number of entries in a branch history table of the processor.

6. A system for profiling an execution of a computer program, the system comprising:
   a memory configured to store a branch history table; and
   a processor coupled with the memory, the processor configured to:
      set a branch-history-entry indicator associated with a branch history table entry (BHTE) from the branch history table, to a first state in response to creating the BHTE;
      profile the execution of the computer program by periodically sampling the branch history table according to a sampling time-interval, wherein sampling the branch history table comprises, in response to the branch-history-entry indicator being in the first state, recording a content of the BHTE; and
      increase the sampling time-interval in response to a sample count of a profiling data entry being less than a number of entries in the branch history table of the processor; and
      decrease the sampling time-interval in response to the sample count being more than the number of entries in the branch history table.

7. The system of claim 6, wherein the sampling time-interval is increased in response to the branch-history-entry indicator being in the first state.

8. The system of claim 6, wherein the contents of the BHTE are recorded in the profiling data entry that includes the sample count that is indicative of a number of samples recorded in the profiling data entry, and wherein the sampling time-interval is increased in response to the sample count being less than a predetermined threshold.

9. The system of claim 8, wherein the processor is configured to increment the sampling count in response to recording the content of the BHTE in the profiling data entry.

10. The system of claim 8, wherein the predetermined threshold is based on a number of entries in the branch history table.

11. The system of claim 8, wherein to profile the execution of the computer program, the processor is further configured to record contents of a program counter register in the profiling data entry and increment the sampling count.

12. The system of claim 11, wherein the processor records the contents of the program counter register in the profiling data entry in response to a program-counter indicator associated with the program counter register being in a first state.

13. A computer program product for profiling an execution of a computer program, the computer program product comprising a computer readable storage medium, the computer readable storage medium comprising computer executable instructions, wherein the computer readable storage medium comprises instructions to:
   set a program-counter indicator to a first state in response to updating a program counter register;
   profile the execution of the computer program by periodically sampling the program counter register according to a sampling time-interval, wherein sampling the program counter register comprises:

in response to the a program-counter indicator being in the first state, recording a content of the program counter register in a profiling data entry, wherein the profiling data entry comprises:
an array of entries; and
a sample count that indicates a number of entries in the array;
change the sampling time-interval, wherein the sampling time-interval is increased in response to the sample count being less than a number of entries in a branch history table and the sampling time-interval is decreased in response to the sample count being more than the number of entries in the branch history table; and
in response to recording the content of the program counter register, set the program-counter indicator to a second state, wherein the first state of the program-counter indicator indicates that the program counter register has been updated and the second state indicates that a current value of the program counter register has been recorded.

14. The computer program product of claim 13, wherein the sampling time-interval is increased in response to the sample count being zero.

15. The computer program product of claim 13, wherein the computer readable storage medium further comprises instructions to:
set a branch-history-entry indicator associated with a branch history table entry (BHTE) from a branch history table, to a first state in response to creating the BHTE; and
wherein, the profiling of the computer program further comprises periodically sampling the branch history table according to the sampling time-interval, wherein sampling the branch history table comprises, in response to the branch-history-entry indicator being in the first state, recording a content of the BHTE.

* * * * *